(12) United States Patent
Monnerat et al.

(10) Patent No.: US 9,229,111 B2
(45) Date of Patent: Jan. 5, 2016

(54) METHOD FOR ESTIMATING THE DIRECTION OF ARRIVAL OF NAVIGATION SIGNALS AT A RECEIVER AFTER REFLECTION BY WALLS IN A SATELLITE POSITIONING SYSTEM

(71) Applicants: THALES, Neuilly-sur-Seine (FR); CENTRE NATIONAL D'ETUDES SPATIALES (CNES), Paris (FR)

(72) Inventors: Michel Monnerat, Saint Jean (FR); Lionel Ries, Viviers Les Montagnes (FR)

(73) Assignees: THALES, Courbevoie (FR); CENTRE NATIONAL D'ETUDES SPATIALES (CNES), Paris (FR)

( * ) Notice: Subject to any disclaimer, the term of this patent is extended or adjusted under 35 U.S.C. 154(b) by 463 days.

(21) Appl. No.: 13/763,718

(22) Filed: Feb. 10, 2013

(65) Prior Publication Data

US 2014/0125521 A1    May 8, 2014

(30) Foreign Application Priority Data

Feb. 10, 2012 (FR) ..................................... 12 00396

(51) Int. Cl.
*G01S 19/22* (2010.01)
*G01S 19/42* (2010.01)

(52) U.S. Cl.
CPC *G01S 19/22* (2013.01); *G01S 19/42* (2013.01)

(58) Field of Classification Search
CPC ................................. G01S 13/02; G01S 19/22
USPC .................. 342/357.21, 357.61, 357.63, 442; 701/467, 468
See application file for complete search history.

(56) References Cited

U.S. PATENT DOCUMENTS 6,784,831 B1    8/2004   Wang et al.
7,973,716 B2 *  7/2011   Elwell, Jr. ............ G01C 21/206
                                                    342/453

2005/0179591 A1   8/2005   Bertoni et al.
2008/0129598 A1   6/2008   Godefroy et al.

FOREIGN PATENT DOCUMENTS

FR          2880693 A1      7/2006

OTHER PUBLICATIONS

Alison Brown, et al., "Multipath Rejection Through Spatial Processing", ION GPS, Internet Citation "URL:http://www.navsys.com/papers/0009003.pdf", Sep. 19, 2000, pp. 2330-2337.
S. Rougerie, et al., "Multipath Mitigtion Methods Based on Antenna Array", International Technical Meeting of the Institute of Navigation, Internet Citation "URL:http://www.ion.org/search/purchase_paper.cfm?jp=p&id=9502", Jan. 24, 2011, pp. 596-605.

* cited by examiner

*Primary Examiner* — Dao Phan
(74) *Attorney, Agent, or Firm* — Baker & Hostetler LLP

(57) ABSTRACT

A method includes estimating a position of a receiver, aboard a moving object, on the basis of the navigation signals emitted by satellites received by an antenna in an antenna array placed on the moving object, and using a three-dimensional geographical map to deduce, geometrically, on the basis of the position of the receiver and of a ray casting starting from the receiver, the number of paths reflected on walls of buildings present in a scene corresponding to an environment surrounding the receiver. The determined number of reflected paths is used to initialize an algorithm for estimating angles of arrival of multi-paths to deduce therefrom angles of arrival of the paths reflected on the walls before reaching the receiver. Optionally, the method can comprise making it possible to bound the distance information error due to a multi-path to render the estimation of direction of arrival of the signals more efficacious.

3 Claims, 3 Drawing Sheets

METHOD FOR ESTIMATING THE DIRECTION OF ARRIVAL OF NAVIGATION SIGNALS AT A RECEIVER AFTER REFLECTION BY WALLS IN A SATELLITE POSITIONING SYSTEM

CROSS-REFERENCE TO RELATED APPLICATION

This application claims priority to foreign French patent application No. FR 1200396, filed on Feb. 10, 2012, the disclosure of which is incorporated by reference in its entirety.

FIELD OF THE INVENTION

The present invention relates to a method for estimating the direction of arrival of navigation signals at a receiver after reflection by walls in a satellite positioning system. The invention applies to any satellite positioning system using receivers of GNSS (Global Navigation Satellite System) type such as GPS (Global Positioning System) or Galileo receivers and makes it possible to improve the rejection of the multi-paths in a satellite positioning system.

BACKGROUND

In a satellite positioning system using a receiver of the GNSS type placed aboard a moving object, the data signals allowing the receiver to calculate its positioning originate from various satellites belonging to a constellation of satellites. The constellation comprises at least four satellites for determining four unknowns corresponding to the geographical x, y, z and temporal t coordinates of the receiver. The positioning of the moving object by the receiver is carried out in two steps. In a first step, the receiver effects the acquisition of radioelectric signals constituting navigation signals originating from the four satellites of the constellation and in a second step, the receiver evaluates the distances separating the moving object from the four satellites whose signals have been received and determines the position of the moving object by using a triangulation method.

An error made in the position of a moving object can have disastrous consequences in an application relating to civilian aviation or geo-located road tolls.

There exist numerous sources of positioning error that may impair the validity of the position information determined by a satellite positioning system. A positioning error may be due to a technical problem with the reception of the GNSS signals, such as for example a failure of the receiver or a failure of the information transmitted by the constellation of satellites used. The reliability of the position determined by a satellite positioning system also depends on the environment in which the moving object is situated.

In the case of an aeronautical application relating to civilian aviation, the receiver is not constrained by any obstacle, so that the radioelectric signals are received directly from the satellites, without reflection on any wall. In this case, there exist SBAS systems (Satellite-Based Augmentation Systems) making it possible to provide a confidence information item relating to the position calculated by the receiver of an aeronautical moving object. The SBAS systems monitor and bound, permanently, the errors made in the orbit of the satellites, in the synchronization of each satellite with the time reference of the constellations and the errors induced by the propagation of the radioelectric signals in the upper atmosphere and in particular in the Ionosphere. The information provided by an SBAS system allows the receiver of the aeronautical moving object to provide the position of the moving object as well as a position error bound.

Geo-located road toll applications consist in determining the road followed by a terrestrial moving object furnished with a GNSS receiver and in billing a user of the terrestrial moving object when the road followed is subject to a toll. Billing being dependent on the road used, the receiver must deliver two complementary information items relating on the one hand, to the position of the moving object and on the other hand, to the trajectory of the moving object. These information items giving rise to billing, it is also necessary to determine a confidence information item relating to the trajectory used.

However, in the case of an application relating to geo-located road tolls, the conditions of reception of the radio-electric signals are much more complex, and much less controlled than in the case of an aeronautical application. It is then much more difficult to bound the position error determined by the receiver.

In an urban setting, the navigation signals emitted by one or by two or three of the satellites of the constellation may for example be stopped by buildings and not arrive at the receiver of the moving object. In this case, the geometry of the set of satellites that are used to calculate the position of the moving object is affected and this may render the calculation of the position of the moving object impossible.

Likewise, in an unfavourable terrestrial setting, the navigation signals emitted by a satellite of the constellation may be reflected on certain walls before reaching the receiver. This phenomenon, called multi-path, has a significant impact on the precision of the position calculated by the receiver. Indeed, the route measured by the receiver is then longer than the distance separating the moving object from the corresponding satellite. This results in an error in the triangulation method and therefore in the position of the moving object. In this case the consequence is twofold since on the one hand, the position error is significant and on the other hand, the receiver has no means of knowing that it has made an error, nor of evaluating the error made. Now, the errors made by the receiver may induce an error of judgment as regards the road followed and consequently induce a false billing.

There exist schemes for rejecting multi-paths consisting in using an array of reception antennas and in analysing the signal received by each of the antennas of the array to determine the angles of arrival of signals reflected by walls before arriving at the receiver. An example of this type of scheme is described notably in the document [Multipath mitigation methods based on antenna array, S. Rougerie, ION NTM 2011]. However, these schemes suffer from a very heavy handicap due to the wavelength of the signals considered. Indeed, in such an array of antennas, the distance separating 2 antennas must be greater than half the wavelength of the signal received. One of the rejection techniques conventionally considered, consists in forming the antenna beam in the direction of arrival of the signal emitted by a satellite, thereby making it possible to reduce the antenna gain in the direction of the potential reflections exhibiting a different angle of arrival from that pointing in the direction of the satellite considered. The directivity of such an array of antennas depends directly on the number of antennas used. Large directivity, allowing effective rejection, requires a large number of antennas, and consequently an array of large size.

In numerous applications, such as vehicle geo-location applications, the size of the arrays is constrained, and may not permit a large number of antennas.

In this case, schemes for identifying the angle of arrival of the reflections of signals are implemented to attenuate the beam in the identified direction or directions. However these schemes suffer from several performance problems. As shown by the document [Multipath mitigation methods based on antenna array, S. Rougerie, ION NTM 2011], a first problem relates to the process for estimating the angles of arrival of reflected signals which requires an assumption as regards the number of reflections to be estimated. The performance of the process for estimating the angles of arrival depends on the correctness of this assumption, as does consequently the performance of the process for rejecting multi-paths and their impacts on the quality of measurement of line-of-sight distance separating the receiver from the satellite. A second problem relates to the quality of the calibration of the array of antennas, namely the knowledge of the exact distance separating the various antennas from one another. The performance in estimating the angles of arrival of the reflected signals depends on the correctness of this information item.

SUMMARY OF THE INVENTION

The aim of the invention is to solve these problems and to propose a method for estimating the direction of arrival of navigation signals reflected in a satellite positioning system making it possible to improve the rejection of the multi-paths and making it possible to improve the quality of a measurement of separation distance between a GNSS receiver and at least one satellite of the constellation and to thus improve the quality of the measurement of the position of the GNSS receiver situated aboard a moving object.

Accordingly, the invention relates to a method for estimating the direction of arrival of navigation signals reflected by walls before reaching a receiver of a satellite positioning system, the positioning system comprising at least one satellite able to emit navigation signals, the receiver, placed in a moving object, being able to receive the navigation signals and to estimate the position of the said receiver, said method comprising the following steps:
  a. placing an array of antennas comprising at least two antennas on the moving object,
  b. placing a three-dimensional geographical map in the receiver of the moving object,
  c. receiving the navigation signals on an antenna of the array of antennas and estimating a position of the receiver,
  d. from the estimated position of the receiver, selecting, on the three-dimensional geographical map, a scene corresponding to an environment in which the receiver is situated and carrying out a ray casting starting from the receiver,
  e. deducing, geometrically, on the basis of the result of the ray casting, the number of paths reflected on walls present in the scene,
  f. selecting an algorithm for estimating the angles of arrival of multi-paths, the multi-paths corresponding to signals reflected by walls, initializing this algorithm by the number of reflected paths determined in step e and deducing therefrom the angles of arrival of the paths reflected on the walls.

Advantageously, the angles of arrival of the multi-paths are determined, by the selected algorithm, on the basis of an analysis of the signals received by each of the antennas of the array of antennas.

Advantageously, before carrying out step c relating to the estimation of the position of the receiver, the method comprises a preliminary step consisting in estimating a distance information error due to a multi-path, the preliminary step consisting:
  in estimating a first pseudo-distance corresponding to a first information item regarding the distance between the satellite and the receiver obtained from a processing of the signal received by a first antenna of the array of antennas,
  in estimating a second pseudo-distance corresponding to a second information item regarding the distance between the satellite and the receiver obtained from a processing of the signal received by a second antenna of the array of antennas,
  in carrying out a difference between the two estimations obtained in steps a and b and deducing therefrom a mathematical standard deviation corresponding to this difference,
  in bounding the distance information error due to a multi-path by an indicator dependent on the mathematical standard deviation.

BRIEF DESCRIPTION OF THE DRAWINGS

Other particular features and advantages of the invention will be clearly apparent in the subsequent description given by way of purely illustrative and nonlimiting example, with reference to the appended schematic drawings which represent.

DETAILED DESCRIPTION

Figure 1:
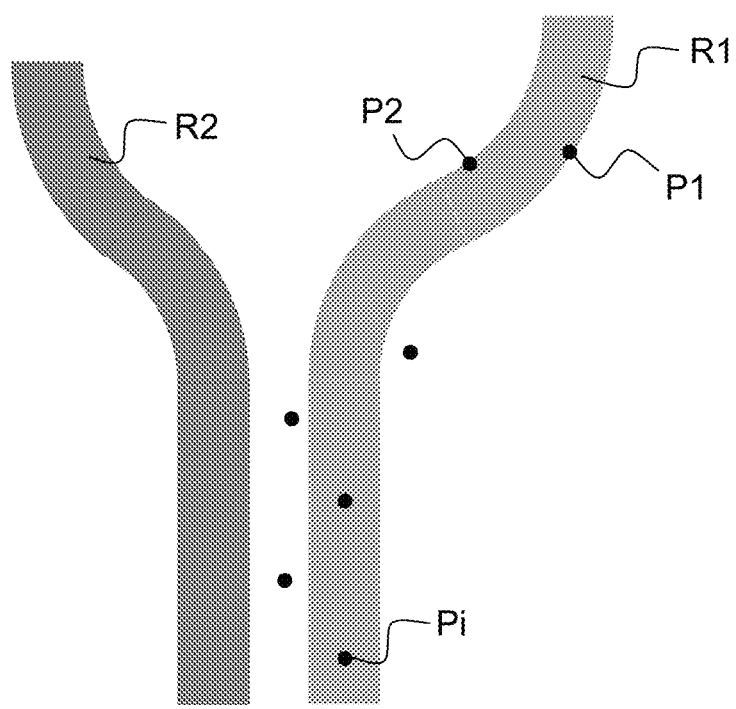
FIG. 1: a diagram of an exemplary typical road system, according to the invention.

FIG. 1 represents a diagram of an exemplary typical road system comprising two possible roads R1, R2. Road R1 is a paying road, road R2 is non-paying. Several moving objects equipped with a GNSS receiver, travel on the paying road R1. The positions P1 to Pi of the various moving objects, where i is an integer number greater than 1, determined by the GNSS receivers of each moving object, are marred by errors. The errors made may induce an error of judgment as regards the road followed and consequently a false bill.

Figure 2:
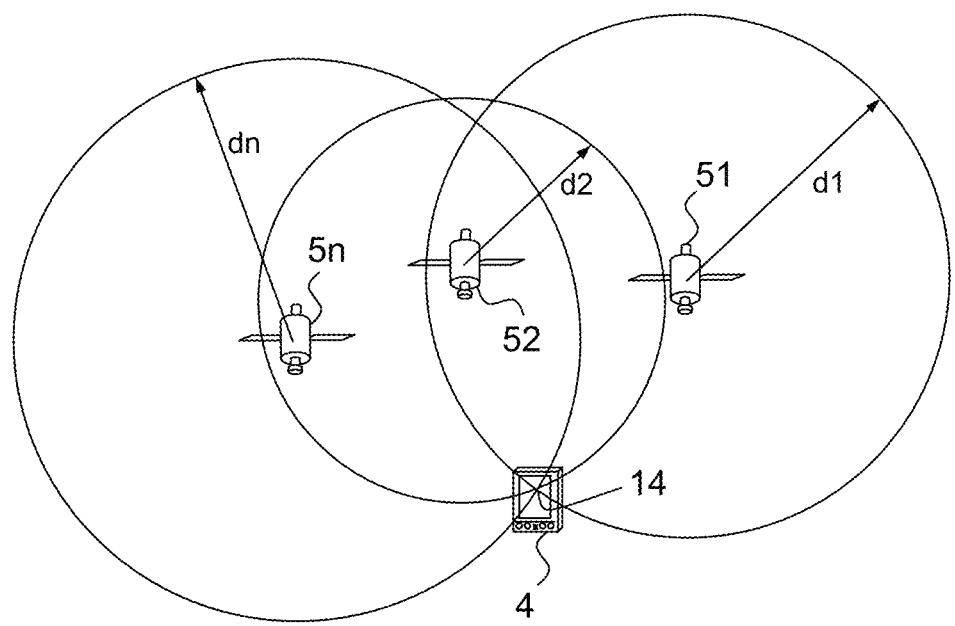
FIG. 2: An example illustrating the determination of the position of a moving object equipped with a GNSS receiver, according to the invention.

An exemplary determination of the position of a moving object equipped with a GNSS receiver 4 is represented schematically in FIG. 2. The receiver 4 determines the distances d1, d2, . . . , dn, where n is an integer number greater than or equal to four, separating it from at least four satellites 51, 52, . . . , 5n of the constellation, only three satellites are represented in FIG. 2, and then deduces therefrom the point of intersection 14 of at least four spheres, centred respectively on the four satellites and having a circumference passing through the receiver 4, each sphere having a centre demarcated by the position of a satellite 51 to 5n of the constellation and having a radius corresponding to one of the distances d1 to dn. The position of the GNSS receiver 4, therefore of the moving object equipped with this receiver 4, corresponds to this point of intersection 14. The measurement of the distances d1 to dn is carried out in the receiver 4 by logging the arrival time of radioelectric signals constituting a navigation message originating from the satellites 51 to 5n. The radioelectric signals emitted by each satellite consist of information items necessary for the calculation of the position of the receiver, these information items being modulated by a code which may for example be a periodic pseudo-random spreading code. The bitrate of the information items is slower than the bitrate of the code. By way of example, in the case of a GPS signal, the spreading code possesses a period of 1 ms and a bitrate of 1023 bits per second whereas the bitrate of the information items is 50 bits per second. The whole of the data added modulo 2 to the spreading code is transmitted on a carrier. Typically, in the case of a GPS signal, the carrier is equal to 1.57542 GHz. The essential information items originating from each satellite via the navigation message and that must be processed by the receiver 4 consist of the time of emission of the message and the position of the satellite at the instant of the emission of the radioelectric signal. Other information items are also transmitted by the satellite, such as certain corrections to be made to the onboard clock of the satellite, parameters of corrections of speed of propagation of the signals in the layers of the terrestrial atmosphere and the approximate positions of the other satellites of the constellation via data termed almanacs. The satellite transmits in its navigation message its ephemerides (Keplerian parameters) allowing the receiver 4 to calculate the position of the satellite in a reference datum tied to the Earth. In the case of a GPS signal the ephemerides consist of 16 parameters repeated every 30 seconds in the navigation message.

The position of the satellite having been obtained, it remains for the receiver 4 to detect the time of emission of the message so as to deduce the propagation time of the signal emitted by the corresponding satellite, the distance separating it from the said satellite and the radius of the corresponding sphere. The time of emission of the message is included in the navigation message broadcast by the satellite and, in the case of a GPS system, is repeated every six seconds. However it is appropriate to apply a satellite clock correction to the time read from the navigation message so as to refer the time transmitted to a reference system common to all the satellites. This correction is transmitted every thirty seconds.

When the time of emission of the message is decoded and corrected, the receiver deduces the propagation time of the radioelectric signal by differencing between the time of reception and the time of emission of the navigation message. This information item, corrected of the errors of speed of propagation of the signals in the various layers of the terrestrial atmosphere such as the Ionosphere, provides the receiver with an estimation of the distance separating it from the satellite. By using the signals originating from at least four satellites 51 to 5n of the constellation, the receiver 4 deduces therefrom its position 14, and therefore that of a mobile user in which it is situated, by a known triangulation method.

Figure 3:
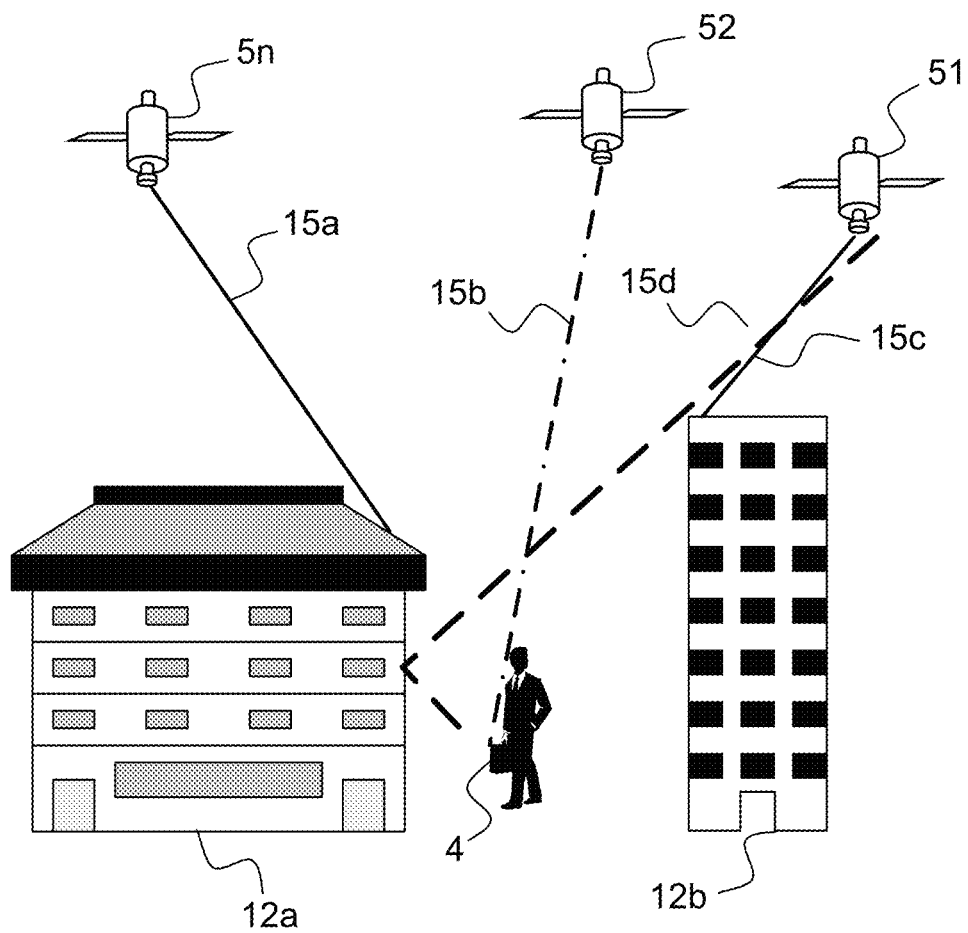
FIG. 3: a diagram illustrating an urban environment, according to the invention.
Figure 4:
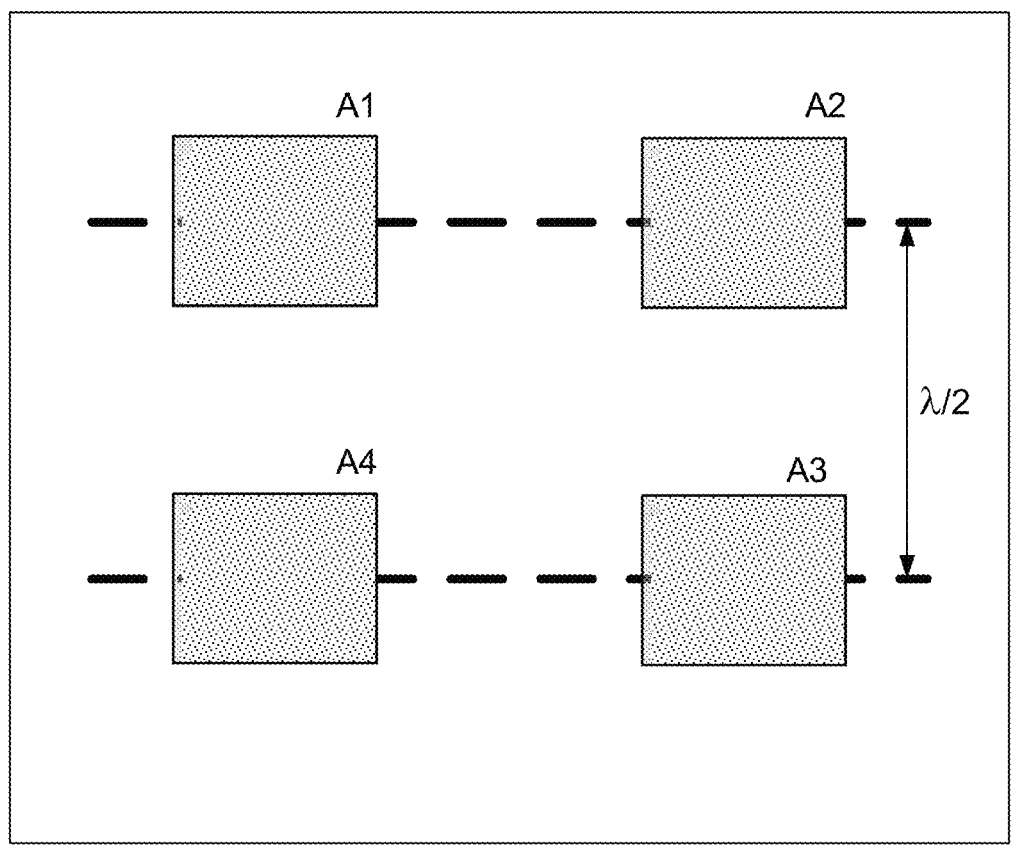
FIG. 4: an exemplary array of antennas, according to the invention.

In an urban setting, as represented for example in FIG. 3, certain signals 15a, 15c arising from the satellites are reflected by walls of buildings 12a, 12b surrounding the receiver 4 and do not arrive at the receiver 4, other signals 15b arrive directly at the receiver 4 and other signals 15d arrive at the receiver after having been reflected by walls of a building 12a such as a residence for example. To avoid errors in determining the distances separating a satellite from the receiver, it is important to be able to eliminate the signals reflected on walls such as building walls and therefore having undergone multiple paths 15d before arriving at the receiver 4. Accordingly, the invention consists in using a receiver 4 placed on a mobile user, for example a pedestrian or a user travelling in a moving vehicle, and an array of antennas placed on the moving object, for example on the roof of a vehicle, the array of antennas making it possible to determine the angles of arrival of signals reflected on walls of buildings. Each antenna is respectively linked to a chain for processing the signals received by the said antenna. An exemplary array of antennas comprising four antennas A1, A2, A3 and A4 is represented in FIG. 4. The four antennas are spaced apart by a distance equal to a half-wavelength $\lambda/2$ and are decorrelated from one another. Each antenna may for example consist of a metallic patch and the four metallic patches corresponding to the four antennas may be of like dimension and disposed in a square. To determine the paths reflected on building walls, it is necessary to ascertain the number of reflected paths to be sought. For example, when the moving object is situated near a wall, because of this wall, a first part of the navigation signal emitted by a satellite which reaches the receiver has a direct path, a second part of the signal firstly reaches the wall and is then reflected on the wall before arriving at the receiver. When there are two walls in proximity to the receiver, there may be two successive reflections on the two walls before the signal reaches the receiver.

To seek the number of reflected paths, it is possible to proceed by successive iterations by making assumptions. In this case, the first assumption is that there is a single reflected path, then two reflected paths, then three reflected paths. At each iteration, an algorithm is used to, on the basis of the information item regarding the number of reflected paths, analyse the signal received by each of the antennas of the array and determine angles of arrival of the signals reflected on walls of buildings. At the end of each iteration, a quality indicator advises as to the reliability of the angles of arrival obtained. When all the iterations have terminated, only the assumption having the best indicator of quality is retained. This method operates well but exhibits the drawback of being very lengthy and of consuming a great deal of computation time.

To seek the number of reflected paths, the method according to the invention consists in using a three-dimensional mapping information item making it possible on the basis of an approximate position of the receiver and for each signal emitted by a satellite, to determine the number of paths reflected on walls before reaching the receiver. Accordingly, the GNSS receiver 4 is equipped with a three-dimensional geographical map.

For a given position 14 of the GNSS receiver, with the aid of the three-dimensional geographical map, a ray casting starting from the receiver is carried out to make it possible to determine the various reflections on the walls, represented graphically in the form of facets, of the buildings surrounding the said receiver. The ray casting is carried out by a conventional graphical method, used for example in the field of electronic games in three dimensions, consisting on the basis of two points in a scene, in seeking all the rectilinear paths, direct and reflected on facets situated in the scene, which make it possible to geometrically join these two points. Thus in FIG. 3, the knowledge of the environment in three dimensions surrounding the receiver 4 makes it possible to determine a reflection originating from the satellite 51, along the path 15c of the signal emitted by the satellite 51.

The determination of the reflections of radiofrequency signals on reflecting walls which is obtained on the basis of the three-dimensional geographical map is merely approximate since the reflections are not purely geometric. On the other hand, the estimation thus carried out makes it possible to determine the number of principal reflections. Their angle of arrival and their intensity is on the other hand rather unreliable.

According to the invention, the result of the estimation of the number of multi-paths, obtained by using the three-dimensional geographical map, is thereafter applied as input to an algorithm for estimating the angles of arrival of the multi-paths so as to initialize this algorithm. On the basis of the information item regarding the number of reflected paths, the algorithm then analyses the signal received by each of the antennas of the array and determines angles of arrival of the signals reflected on walls of buildings.

The method according to the invention allows good estimation of the angles of arrival of the various reflected signals. It makes it possible, by applying an amplitude and phase law to the reception channels of the antennas of the array of antennas, to attenuate the antenna pattern in the said directions of arrival of the said multi-paths. Finally, as a function of the number of multi-paths considered, and of the number of antennas of the array of antennas, the method according to the invention makes it possible to estimate the residual of disturbance on the measurement. This residual is an indicator of quality of the measurement of distance separating the receiver from the satellite.

The estimation of the directions of arrival of the multi-paths as well as the ray casting schemes are complex in terms of number of computational operations. To optimize the method for estimating the directions of arrival of the multi-paths, advantageously, the invention can comprise a preliminary step consisting in estimating the level of multi-paths before launching the estimation method described hereinabove. The estimation of the level of multi-paths consists on the basis of the navigation signals received on at least two different antennas separated by half a wavelength and belonging to the array of antennas, in determining two distance information items, called pseudo-distances, relating to the separation distance between the receiver and the satellite. The method thereafter consists in calculating the difference between the two values of pseudo-distances obtained on the basis of the two antennas. In the case where the level of multi-paths is low, the difference between delays estimated by each of the spreading code tracking loops associated with each antenna gives an almost zero result corresponding to background noise, this background noise corresponding to the thermal noise of the 2 reception chains of the two antennas, a good approximation of which is provided by Gaussian white noise.

In the case where the level of multi-paths is high, the variance of the delay difference delivered by the spreading code tracking loops applied to the two different radiofrequency chains will be high. Let $\rho^1_k$ be the pseudo-distance measured by the spreading code loop processing the signal of satellite k received by the first antenna, and let $\rho^2_k$ be the pseudo-distance measured on the spreading code loop processing the signal received by the second antenna. The difference $\delta\rho_k = \rho^1_k - \rho^2_k$ represents the difference in journey length between the satellite and the 2 antennas.

The standard deviation, a mathematical quantity corresponding to the square root of the variance, estimated on this difference, and denoted $\sqrt{E(\delta_k \overline{\delta_k})}$, is an estimator of the power of the noise added by the environment.

It follows from this that the precision of measurement of pseudo-distance on an antenna can be bounded by:

$$\sqrt{\frac{E(\delta_k \overline{\delta_k})}{2}}.$$

This indicator makes it possible to detect the presence of an unfavourable environment and as a consequence to directly bound the pseudo-distance measurement error.

Although the invention has been described in conjunction with particular embodiments, it is very obvious that it is in no way limited thereto and that it comprises all the technical equivalents of the means described as well as their combinations if the latter enter within the framework of the invention.

The invention claimed is:

1. A method for estimating the direction of arrival of navigation signals at a receiver after reflection by walls in a GNSS satellite positioning system, the positioning system comprising at least one satellite able to emit navigation signals, the receiver, placed in a moving object, being able to receive the navigation signals and to estimate the position of the said receiver, said method comprising the following steps:
   a. placing an array of antennas comprising at least two antennas on the moving object,
   b. placing a three-dimensional geographical map in the receiver of the moving object,
   c. receiving the navigation signals on an antenna of the array of antennas and estimating a position of the receiver,
   d. from the estimated position of the receiver, selecting, on the three-dimensional geographical map, a scene corresponding to an environment in which the receiver is situated and carrying out a ray casting starting from the receiver,
   e. deducing, geometrically, on the basis of the result of the ray casting, the number of paths reflected on walls of buildings present in the scene,
   f. selecting an algorithm for estimating the angles of arrival of multi-paths, the multi-paths corresponding to signals reflected by walls, initializing this algorithm by the number of reflected paths determined in step e and deducing therefrom the angles of arrival of the paths reflected on the walls before reaching the receiver.

2. The method according to claim 1, wherein the angles of arrival of the multi-paths are determined, by the selected algorithm, on the basis of an analysis of the signals received by each of the antennas of the array of antennas.

3. The method according to claim 1, wherein before carrying out step c, the method comprises a preliminary step consisting in estimating a distance information error due to a multi-path, the preliminary step comprising:
   step 1: estimating a first pseudo-distance corresponding to a first information item regarding the distance between the satellite and the receiver obtained from a processing of the signal received by a first antenna of the array of antennas,
   step 2: estimating a second pseudo-distance corresponding to a second information item regarding the distance between the satellite and the receiver obtained from a processing of the signal received by a second antenna of the array of antennas,
   carrying out a difference between the two estimations obtained in steps 1 and 2 and deducing therefrom a mathematical standard deviation corresponding to this difference, and
   bounding the distance information error due to a multi-path by an indicator dependent on the mathematical standard deviation.

* * * * *